(12) United States Patent
Friesenhahn, Sr. et al.

(10) Patent No.: US 7,255,526 B2
(45) Date of Patent: Aug. 14, 2007

(54) RAPID ASSEMBLY GAME BLIND TRANSPORT TRAILER

(76) Inventors: Lawrence Friesenhahn, Sr., 1204 Zanderson Ave., Jourdanton, TX (US) 78026; Lawrence Friesenhahn, Jr., 1204 Zanderson Ave., Jourdanton, TX (US) 78026

( * ) Notice: Subject to any disclaimer, the term of this patent is extended or adjusted under 35 U.S.C. 154(b) by 186 days.

(21) Appl. No.: 10/839,006

(22) Filed: May 6, 2004

(65) Prior Publication Data

US 2005/0281649 A1 Dec. 22, 2005

(51) Int. Cl.
*B60P 1/00* (2006.01)
(52) U.S. Cl. ............... 414/483; 135/901; 182/63.1
(58) Field of Classification Search .......... 135/901; 182/63.1; 414/483
See application file for complete search history.

(56) References Cited

U.S. PATENT DOCUMENTS

| | | | | |
|---|---|---|---|---|
| 2,992,037 A | * | 7/1961 | Nusbaum | 296/168 |
| 3,284,128 A | * | 11/1966 | Alarie | 296/173 |
| 3,458,231 A | * | 7/1969 | Glass | 296/173 |
| 3,476,270 A | * | 11/1969 | Cox et al. | 414/21 |
| 3,618,801 A | * | 11/1971 | Blanchard | 414/483 |
| 4,442,919 A | * | 4/1984 | Fulcher | 182/63.1 |
| 4,719,716 A | * | 1/1988 | Chrisley, Jr. | 43/1 |
| 4,749,317 A | * | 6/1988 | Daniel | 410/26 |
| 5,295,555 A | | 3/1994 | Strange | |
| 5,371,966 A | * | 12/1994 | Hall | 43/1 |
| 5,762,085 A | * | 6/1998 | Punch | 135/93 |
| 5,862,827 A | | 1/1999 | Howze | |
| 6,017,081 A | * | 1/2000 | Colby | 296/173 |
| 6,290,023 B1 | * | 9/2001 | Martin | 182/127 |
| 6,347,684 B1 | * | 2/2002 | Fath et al. | 182/63.1 |
| 6,460,653 B1 | | 10/2002 | Hardy et al. | |
| 6,523,641 B2 | | 2/2003 | Smith | |
| 2004/0177571 A1 | * | 9/2004 | Johnson | 52/143 |

FOREIGN PATENT DOCUMENTS

DE 019810024 A1 * 3/1998

* cited by examiner

*Primary Examiner*—Thomas J. Brahan
(74) *Attorney, Agent, or Firm*—John Karl Buche

(57) ABSTRACT

A rapid assembly game blind transport trailer that breaks at pivot points in folding fashion and stands upright along with the attached game blind as a driver moves in reverse, and which allows rapid standing and easy separation or attachment of the blind and trailer unit.

21 Claims, 7 Drawing Sheets

RAPID ASSEMBLY GAME BLIND TRANSPORT TRAILER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present invention relates to the field of game blinds and specifically trailers for transporting game blinds.

2. Description of Prior Art

As any hunter will recount, it can be a tremendous hassle to move a game blind from a trailer and erect the blind so that it is useable. The majority of systems rely on a complex array of ropes, wenches or chains, which can all be complicated to assemble. Also, a typical game blind assembly will require more than one person to be done efficiently. Difficulties with blind assembly may be amplified under inclement conditions, for instance, cold, rain, or darkness, all of which make rapid assembly even more desirable. From the hunter's perspective, it is desirable to have a blind that sets up with nominal effort, and preferably by one person. There are a variety of game blinds on the market, and some are portable, however, none achieve portability and assembly with the ease of the present invention. For example, in U.S. Pat. No. 6,460,653 to Hardy, the inventor has a game blind that is constructed as part of a trailer, and which unfolds in much the same manner as a pop-up camper. A similar design is found with U.S. Pat. No. 6,523,641. Other attempts at portable blinds have included hydraulically operated blinds that are part of a trailer, as are found in the Strange U.S. Pat. No. 5,295,555, and the Howze U.S. Pat. No. 5,862,827 None of the patents, however, are directed to a trailer that helps to transport and stand a blind upright before separating from the blind. The present trailer is unique in providing a nearly effortless set up for the blind. The present invention uses a pivoting trailer mechanism so that assembling the game blind is almost as simple as driving a vehicle in reverse. Because of the trailer's unique design, it is able to break at a pivot point and act as a lever on itself so that it will stand up in a vertical manner, along with the attached game blind, as the driver moves in reverse pushing the trailer. At a point where the trailer and attached blind are vertical, the game blind is separated from the trailer, which trailer may then be pulled away leaving the standing blind in place and ready for use. By the same mechanism, retrieval of the blind is equally improved when the process is performed in reverse and the blind is removed from a standing to a transportable position.

SUMMARY OF THE INVENTION

Accordingly, it is the objective of the present invention to provide a novel trailer design that permits rapid placement of a game blind in the field. The basic concept behind the invention is a trailer that allows the user to stand a blind upright with maximum efficiency and which is preferably operable by a single person, although other persons could participate. The trailer frame breaks at a pivot point so that when the trailer is pushed backwards by a vehicle, the rear portion of the trailer will dig into the ground and the pivoted trailer will stand upright with the attached game blind, which blind may then be released from the trailer fully assembled, upright and ready for use.

It is a further object of the present invention to provide a rapid assembly game blind trailer that does not primarily depend on chains, ropes and hoists to move the blind to an upright position.

It is a further object of the present invention to provide a rapid assembly game blind transport trailer that permits delivery of a full sized game blind that is already assembled and ready for use once placed in the upright position and disconnected from the trailer.

It is a further object of the present invention to provide a trailer of solid construction, and durable for use in the field.

It is a further object of the present invention to provide a trailer that may hitch to multiple similar trailers, so that the user may transport multiple blinds at the same time.

Other objectives of the invention will become apparent to those skilled in the art once the invention has been shown and described.

BRIEF DESCRIPTION OF THE DRAWING

The manner in which these objectives and other desirable characteristics can be obtained is explained in the following description and attached drawings in which:

FIG. 5 additionally includes a close up view of the trailer hitch and depicts a preferable swivel tongue mechanism.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
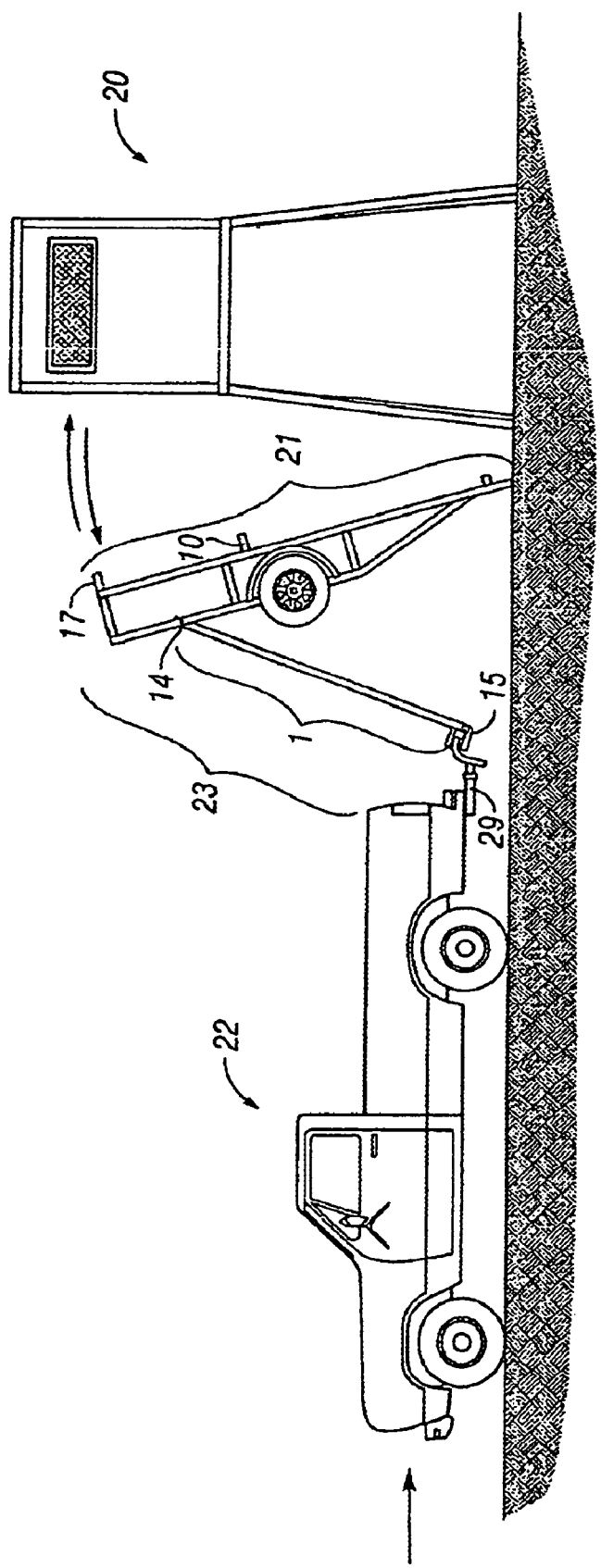
FIG. 1 is a side view of the trailer in use and shows how when a vehicle attached to the trailer moves in reverse, the trailer can break at a pivot point on its frame so that the remainder of the trailer frame stands upright with the game blind attached to the frame, and whereby the blind may then be released and is ready for use.

FIG. 1 is a straight side view of the trailer assembly in use. This figure shows the preferable mode of use of the invention, which is to assist erection of a game blind 20. In this figure, a motor vehicle 22, which is typically a truck, car, or ATV, is shown operating in reverse and pushing backwards on the trailer unit 23, which pivots in hinging fashion on itself at pivot points 14 and causes the trailer unit 23 to stand upright, along with attached game blind 20, which may be separated from the trailer unit 23 after it is in substantially upright position. The motor vehicle 22 attaches to the trailer unit 23 at a hitch 15, which is preferably of a swivel tongue design. Such a design permits the hitch 15 to bend at steep angles of up to 90 degrees, without causing detrimental stress to the trailer unit 23 or motor vehicle 22. A variety of commercially available hitch means may also be used with the present invention, with a primary function of the hitch 15 being to secure the trailer unit 23 to motor vehicle 22. FIG. 1 depicts two components of the trailer unit 23, namely a Front-frame component 1 that forms a front portion of the trailer unit 23, and a main trailer body 21 that forms a rear portion of the trailer unit 23. As the motor vehicle 22 operator moves in reverse, the trailer unit 23 will hinge at pivot points 14 so that the Front-frame component 1 and main trailer body 21 act against one another in hinging fashion to fold upwards from the ground, thereby causing the game blind 20 fixed to the main trailer body to move towards an upright position. The folding motion also works best when the main trailer body 21 is securely fixed, or wedged into to the ground at a rearmost point of the main trailer body 21, which will be further described in this specification. At the point where the game blind 20 is substantially upright, the game blind 20 is manually released from the main trailer body 21, so that it stands alone and is ready for use. The game blind 20 depicted is a four legged stand alone blind commonly known, although the trailer unit 23 which is the present invention contemplates transporting and standing a variety of game blinds 20 of other shapes and sizes known in the industry, so long as they are elevated and need to be stood upright prior to use.

Figure 2:
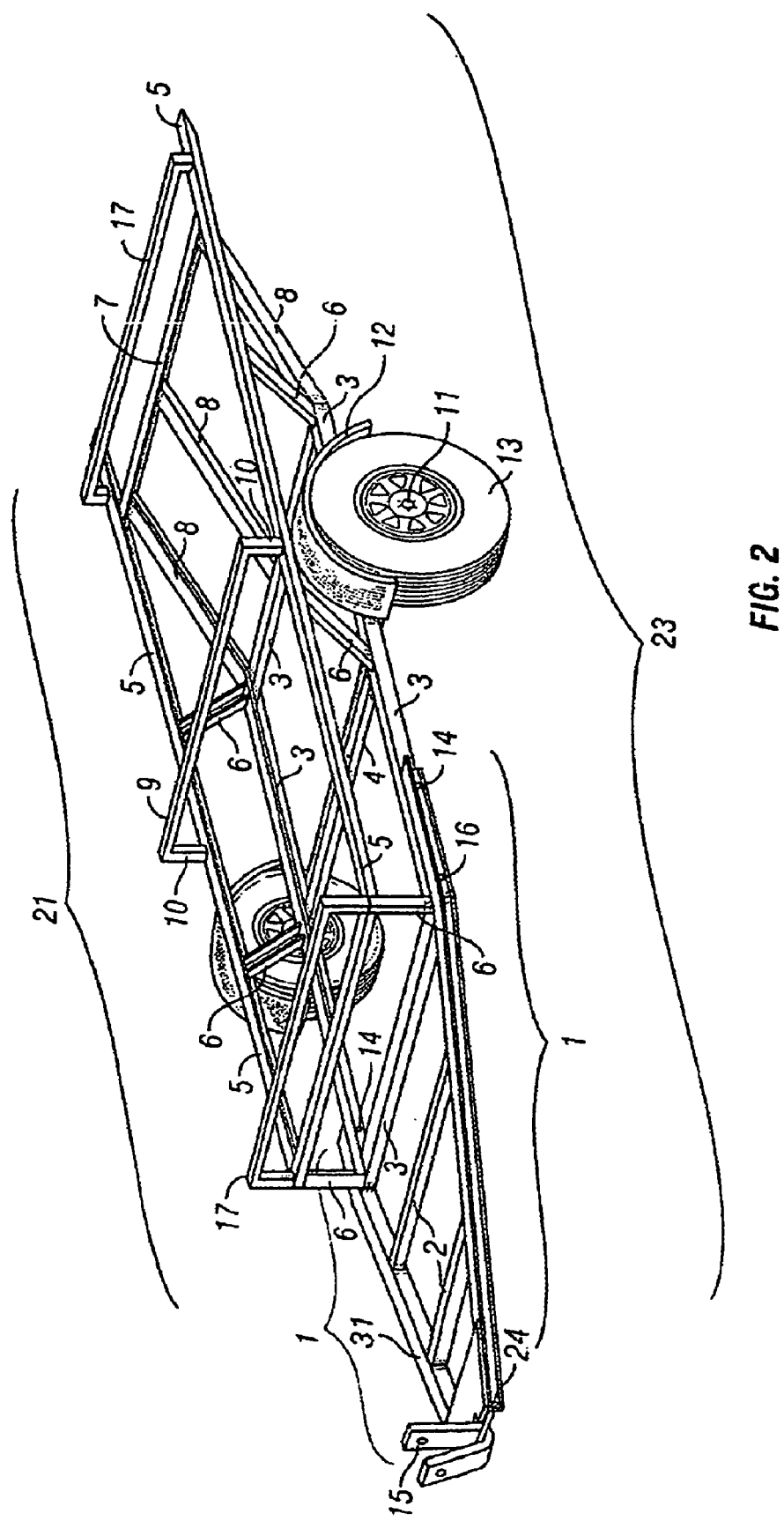
FIG. 2 is a three-dimensional side view of the trailer that depicts many of the basic features of the trailer as the trailer appears in a non pivoted position, and without a game blind affixed to the trailer.

FIG. 2 is a three-dimensional side view of the trailer and it displays many of the features of the trailer unit 23 as the trailer appears in a non pivoted position, and without a game blind 20 affixed to the trailer. This is the trailer shown in FIG. 1, but with greater detail.

Initially, the framework of the trailer unit 23 is preferably built with heavy wall channel iron, with a four inch thickness being preferable, and all metal components being preferably solidly welded. All trailer unit 23 components described are preferably metal. Heavy wall channel iron is a good material for durability, although the invention contemplates that other materials can be used for primary components of the trailer unit 23, such as reinforced aluminum, steel, titanium, mixtures of metal alloys, reinforced carbon and plastic materials, some of which have useful characteristics such as reduced weight, enhanced strength or resistance to rust and the elements. Also, the principal framework of the present invention is preferably rectangular bar shaped frame, but the inventor contemplates that the entire trailer unit 23 might also be comprised of framing of non-rectangular shapes, for instance rod, triangular, I-beam, or U-shape construction. Furthermore, the basic frame structures depicted in this invention are welded, but the inventor contemplates that the frame structures might also be cast and of uniform construction or partially-cast from molds to facilitate strength and rapid production.

FIG. 2 shows many of the same components of the trailer unit 23 shown in FIG. 1, namely the Front-frame component 1 and the main trailer body 21, but in greater detail. The Front-frame component 1 forms a front portion of trailer unit 23, where a first bar 30 and second bar 31 of the Front-frame component 1 form a triangular apex 24 at an end that connects to the hitch 15 that in turn is adapted to connect the entire trailer unit 23 to a motor vehicle 22. The Front-frame component 1 has the overall appearance and shape of a wishbone, so that first bar 30 and second bar 31 of the Front-frame component 1 extend away from the triangular apex end 24 and rearward in the direction of the main trailer body 21. At the point where the first bar 30 and second bar 31 of the Front-frame component 1 meet the main trailer body 21, they each bend at an inward angle so that both bars of the Front-frame component 1 are situated flush against the side bars of a lower frame 3 of the main trailer body 21. At a point on first bar 30 and second bar 31 of the Front-frame component 1 most opposite the triangular apex end 24, both bars of Front-frame component 1 form pivot points 14. Pivot points 14 define a rotatable hinging connection means between first bar 30 and second bar 31 of Front-frame component 1 and the lower frame 3 of main frame trailer body 21. The pivot points 14 are the location of the trailer unit 23 where the trailer folds on itself when the invention is being used to erect a game blind 20. The important feature of pivot points 14 is that the rotatable fixed connection between the Front-frame component 1 and lower frame 3 permits scissor like rotation of the Front-frame component 1 bars around the lower frame 3 at the pivot points 14. A variety of connections are capable of accomplishing this rotating pivot movement, for instance, metal pins are preferably used to connect the lower frame 3 and the Front-frame component 1 bars in a manner where the respective components may rotate around one another at the pivot points 14. Alternately, it is preferable for a metal rod to extend, as would an axle, completely through holes drilled through both the lower frame 3 and Front-frame component 1 bars, so that the lower frame 3 and Front-frame component 1 bars are secured to one another, but still permitting rotation. The Front-frame component 1 also is preferably reinforced with at least one Front-frame cross support 2, which is affixed and secured, preferably by welding, between Front-frame component 1 bars at equidistant positions on the Front-frame first bar 30 and second bar 31. Such Front-frame cross supports 2 are also preferably comprised of heavy wall channel iron. It should be noted that the Front-frame component 1 does not necessarily need to be of wishbone shape or "A-frame" shape, although the inventor to has found this a preferable shape for accomplishing the primary inventive end of a trailer unit 23 that folds in two at pivot points 14 to permit standing up of a game blind. More "squared" or rectangular features might also be preferably used for the front portion of the trailer referred to herein as the Front-frame component 1.

FIG. 2 shows the trailer in a non-pivoted position, as it would be situated during transport of a game blind 20, although the game blind 20 is not shown in this drawing. To prevent the trailer from pivoting during transport, a fastening means 16 is used to secure the Front-frame component 1 to the main trailer body 21. The critical feature of the fastening means 16 is that it permit the user to "lock" the Front-frame component 1 to the main trailer body 21 so that it does not rotate around the pivot points 14 at undesirable times, such as during transport, when the entire trailer unit 23 needs to perform as would any other non-pivoting trailer. Preferably, as shown in FIG. 2, the fastening means 16 are located at equidistant points on the trailer unit 23 where the Front-frame component first bar 30 and second bar 31 meet the lower frame 3 of the main trailer body 21, and also in positions forward of the pivot points 14. The present invention preferably employs a lever pin as the fastening means 16 to prevent pivoting action. Unless the lever pin is manually removed by the user of the trailer unit 23, the trailer unit will not pivot. The pin remains in place during transport and until such time as it is desirable to either deposit or retrieve the game blind 20 and it becomes necessary that the trailer pivot.

The main trailer body 21 shown in FIG. 2 defines a principally rectangular shape and is the portion of the trailer unit 23 to which a game blind 20 affixes. The main trailer body 21 is comprised of a lower frame 3 and an upper frame 5, which are in turn connected to one another by a plurality of connector joints 6.

The lower frame 3 defines a rectangle, where each of four lower frame bars are connected at their ends, and where each of the four lower frame bars are preferably made of channel iron or other suitable material as previously described. Of the four lower frame bars forming the rectangle, two of those bars that run the length of the trailer are connected to the Front-frame component 1 as previously described at pivot points 14, and also by releasable fastening means 16 at a point where the Front-frame component 1 bars, first bar 30 and second bar 31, first meet the lower frame 3.

In addition to serving as a preferable attaching point for the Front-frame component 1, the length running bars of the lower frame 3 serve as preferable attachment points for the wheel assemblies 11. The wheel assemblies 11 are similar to most wheel assemblies 11 on trailers, including a basic wheel, which supports a tire 13, which is preferably covered by a fender 12. The wheel assemblies 11 preferably connect directly to the lower frame 3 bars running along the length of the trailer. Optionally, wheel assemblies could connect to the trailer by way of an axle running across the trailer, or in other ways that are known and commonly practiced on trailers. Another option for this trailer would be to use a dual-wheel assembly, either side-by-side on the same axle or with a tandem wheel assembly, i.e., two wheel assemblies on the same side of the lengthwise lower frame 3 bars, but placed on separate axles. Additionally, the inventor contemplates that tail and brake lights might preferably be mounted to the trailer in the vicinity of the wheel assemblies and be adapted to connect to the braking lights of the vehicle moving the trailer unit 23. Lights might also be affixed to the rearmost portion of the trailer.

The lower frame 3 bars of FIG. 2 connect to the upper frame 5 bars by a plurality of connector joints 6. The drawing depicts connector joints 6 at each of the four corners of the lower frame 3, extending upward toward the upper frame 5. The connector joints 6 at the forward most position of the trailer are typically and primarily perpendicular in orientation relative to the upper frame 5 and lower frame 3 which they connect. The remaining connector joints 6 preferably extend outwardly as they extend from the lower frame 3 and approach and connect the upper frame 5. The reason for this is that the upper frame 5 bars preferably flare outward as they extend toward the rear portion of the trailer unit 23.

The upper frame 5 of the main trailer body 21 is comprised of three bars, two of which run the length of the trailer. A third bar, which runs the width of the trailer is fixedly connected at both of its ends to the lengthwise bars at ends of the lengthwise bars located at forward positions on the trailer. The opposite ends of the lengthwise bars of upper frame 5 protrude from the trailer unit 23 and are two ends forming the rearmost portion of the trailer unit 23. Preferably, the lengthwise bars of upper frame 5 form an angle greater than ninety degrees relative to the widthwise third bar of upper frame 5 so that the lengthwise bars gradually sweep or flare out and away from the trailer unit 23 as they extend to the rearmost portion of the trailer unit 23. This configuration provides stability for the trailer and support for the cargo. These protruding ends of the lengthwise bars of upper frame 5 are the portions of the trailer unit 23 which dig into the surface where a game blind 20 is being erected and secure the main trailer body 21 to the ground so that it will fold upward as it folds at the pivot points 14 against the Front-frame component 1. The protruding ends stick best in softer ground, such as dirt, but will even suffice as a "backstop" for the folding trailer action on concrete if a user places a weight, or even a foot behind the protruding ends as the pivoting action is initiated and trailer moves in reverse.

Various other cross-support bars are depicted in FIG. 2 that are preferable in lending additional support to the trailer unit 23. For instance, FIG. 2 depicts lower frame cross support bar 4, upper frame cross support bar 9, and frame end cross support bar 7, all of which run the width of the trailer and are positioned in substantially perpendicular fashion to length running bars of lower frame 3. Lower frame cross support 4 is shown extending between and connecting to lengthwise bars of lower frame 3 at a position in front of the wheel assemblies 11 and between the wheel assemblies 11 and pivot points 14. The purposes of this additional bar should be apparent to one skilled in the art as providing enhanced support to the trailer unit 23 and the same is true of frame end cross support bar 7 which provides widthwise support at the rearmost portion of the trailer unit 23, being fixedly connected at both ends to lengthwise bars of the upper frame 5 at a point on the lengthwise bars to the rear of the main trailer body 21 and after the rearmost connector joint 6. Upper frame cross support bar 9 is depicted extending the width of the trailer unit 23 at a midpoint of the length of the main trailer body 21 above the wheel assemblies 11, and with the upper frame cross support bar 9 being fixedly connected at both of its ends by vertical stabilizer bars 10 which are fixedly connected to the upper frame 5 on the lengthwise bars of upper frame 5. The upper frame cross support bar 9 offers enhanced support to the trailer unit 23, but also serves as a resting and securing location for the cargo being carried. The same is true of blind rest bars 17 which are preferably mounted widthwise at the front of the main trailer body 21 on top of upper frame 5, and which may also be mounted at the rear of the main trailer body 21 to help secure the cargo. Such blind rest bars 17 also serve a location to tie down the game blind 20 during transport.

FIG. 2 also shows diagonal support bars 8, which are located toward the rear of the main trailer body 21 and extend lengthwise on the trailer beginning at the lower frame 3 and extending upward at an angle to fixedly connect with frame end cross support bar 7. A plurality of such diagonal support bars 8 are preferable, with three shown in FIG. 2, one at a midpoint of the width of the trailer, and two occurring at the lengthwise bars of upper frame 5 along the sides of main trailer body 21. These diagonal support bars 8 offer enhanced support to the trailer unit 23, particularly when the trailer is pivoting to deliver or retrieve a game blind 20.

Figure 3:
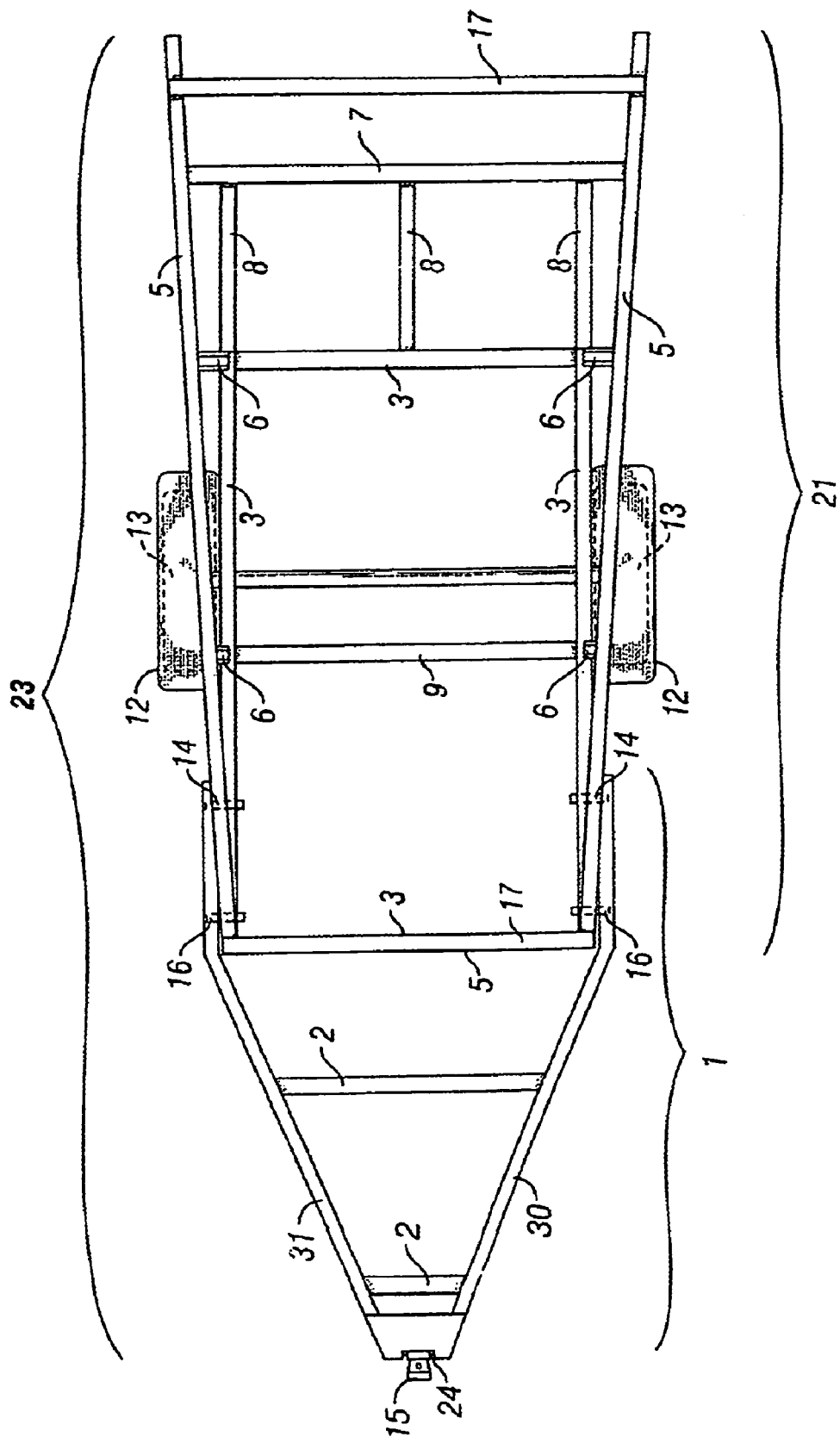
FIG. 3 is a top view of the trailer as it appears in non-pivoted position, and without a game blind affixed to the trailer.

FIG. 3 is a top view of the trailer unit 23, further describing the components described in FIG. 2. This drawing is particularly useful in observing the preferable flaring of the lengthwise bars of upper frame 5. These lengthwise bars preferably form an angle greater than ninety degrees relative to the widthwise third bar of upper frame 5 and the lengthwise bars of upper frame 5 are clearly shown to gradually sweep or flare out and away from the trailer unit 23 as they extend to the rearmost portion of the trailer unit 23. The drawing is also useful in showing how the lengthwise bars of the upper frame 5 protrude from the rearmost portion of main trailer body 21. FIG. 3 is also useful in describing preferable features of the trailer unit 23, which involve lengths and widths of the various trailer components. For example, it is preferable that straight portions of the Front-frame component bars 1, first bar 30 and second bar 31, be in the range of 40 to 300 inches in length, to provide adequate leverage for the function of the trailer. However, an ideal length of the straight portions of the Front-frame component bars 1, first bar 30 and second bar 31, is preferably 140 inches long from the triangular apex 24 to the points where they connect to lower frame 3. Lower frame 3 may be of a width in the range of 30 to 200 inches and a length in the range of 60 inches to 400 inches, however, lower frame 3 is also preferably 80 inches in width and 116 inches in length. The difference in height between upper frame 5 and lower frame 3 is preferably in the range of 5 to 30 inches, however, a there are preferably 14 inches between upper frame 5 and lower frame 3. The lengthwise bars of upper frame 5 are preferably in a length in the range of 60 to 400 inches, however, an ideal preferential length is 116 inches. The widthwise bar of upper frame 5 can be in the range of 30 to 200 inches, but is preferably 80 inches in width. The pivot points 14 are preferably located 30 inches behind the most forward widthwise bar of lower frame 3, although the pivot points 14 could also be preferably located at any point forward of the wheel assembly but behind the forward widthwise bar of lower frame 3. The diagonal support bars 8 are preferably in the range of 20 to 70 inches in length, with an ideal preferable length of 53 inches.

Figure 4:
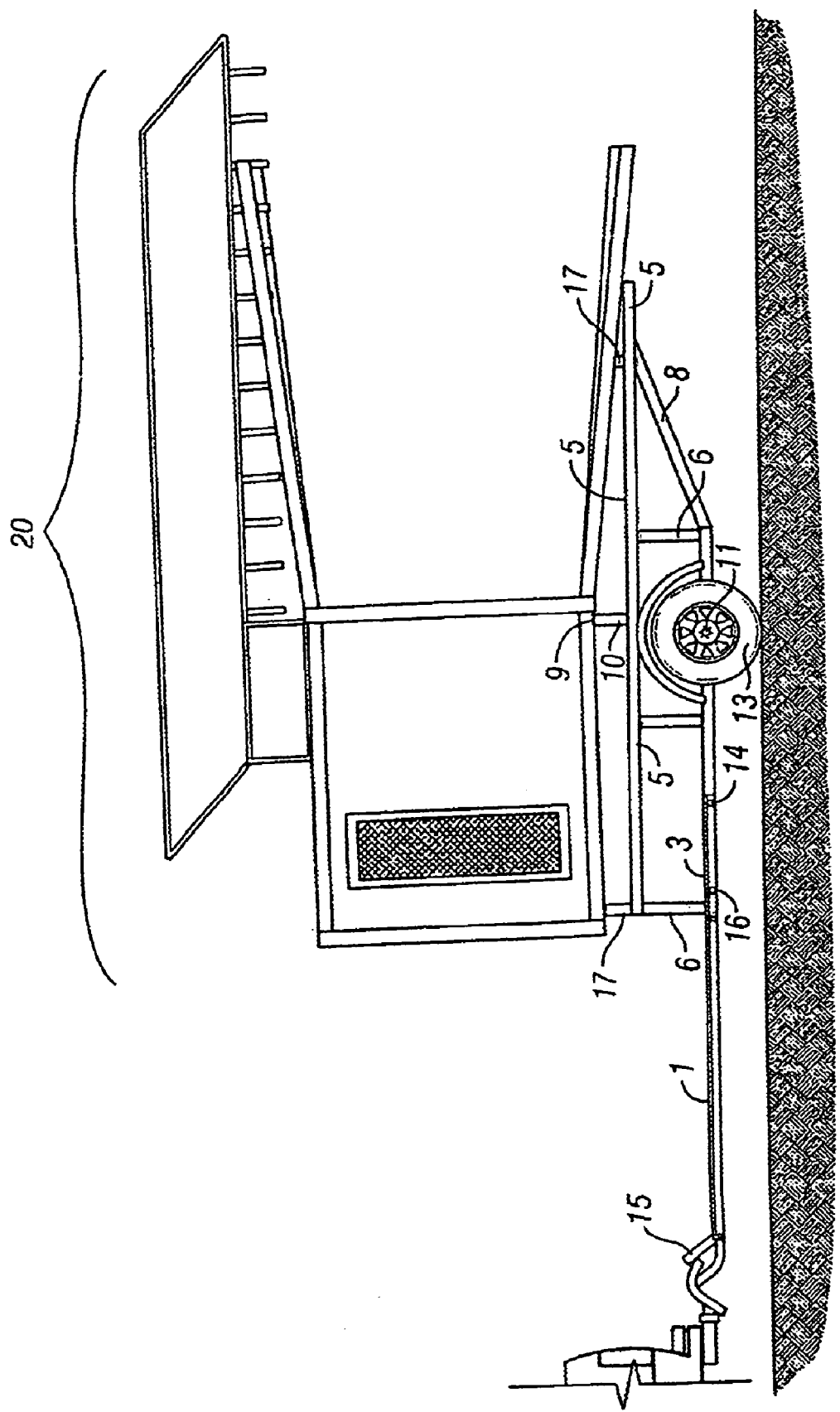
FIG. 4 is a straight side view of the trailer with a game blind affixed to the top of the trailer as the unit would appear during use and during transport of the blind.

FIG. 4 illustrates the mode of using the trailer with game blind 20 affixed as it would appear during and when ready for transport. The drawing shows transport of a traditional four-legged blind, although other blind varieties can be transported by the present invention, which is useful to transport and erect any game blind that is elevated and must stand upright in the field. FIG. 4 also demonstrates how blind rest bars 17 and the upper frame cross support bar 9 are used as a resting place for the cargo (game blind 20), which is further stabilized when fastened to the blind rest bars 17 and upper frame cross support bar 9 with ropes, chains, bungee cords, bands, or other fastening means known in the industry. These securing devices are merely to secure the game blind and not necessary for hoisting the game blind to an upright position as in much of the prior art.

Figure 5:
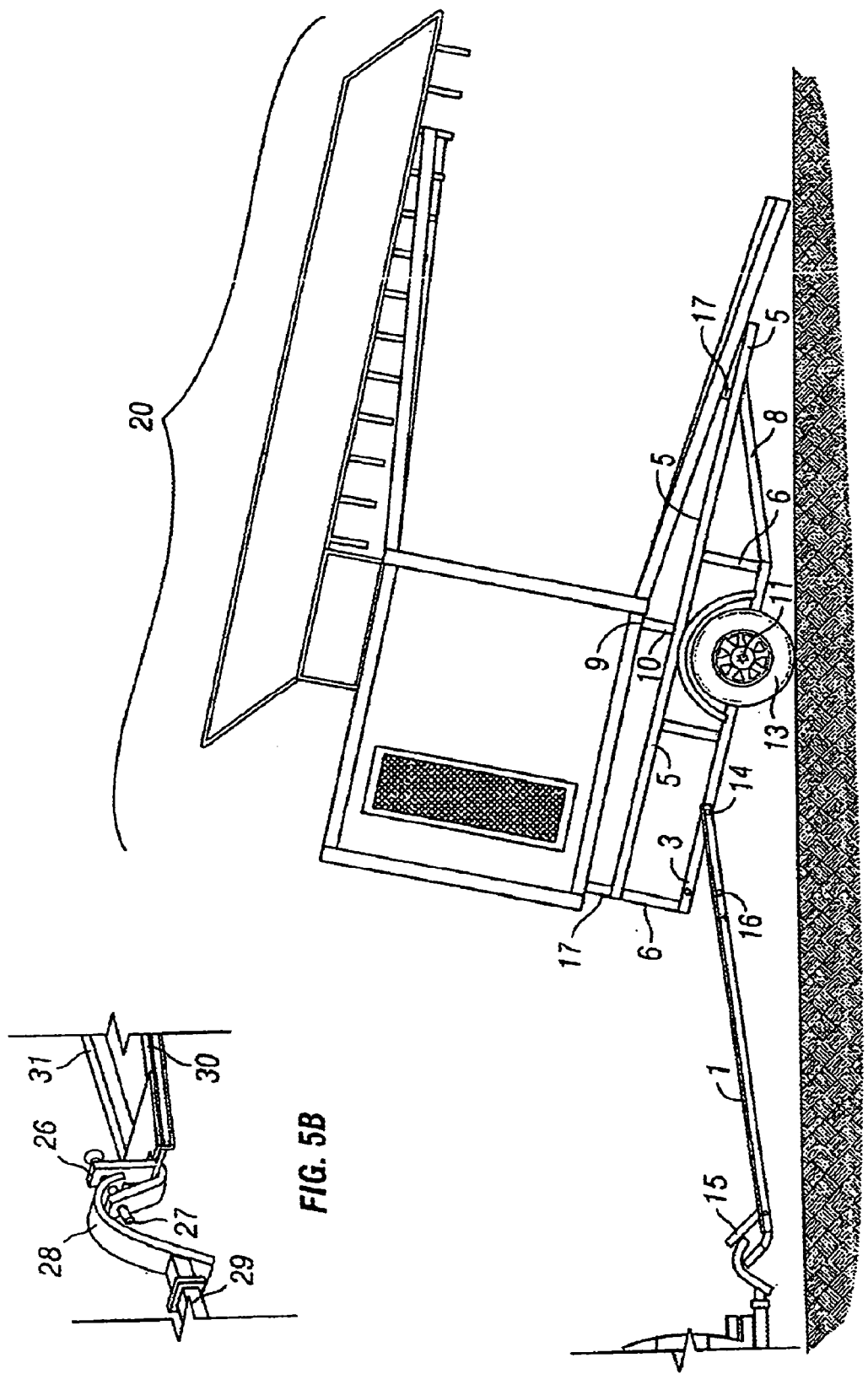
FIG. 5 is a straight side view of the trailer with game blind affixed to its top with the trailer in the initial pivoted position, and as it would appear when the user of the trailer was driving in reverse, beginning to pivot on itself, and in the process of standing the trailer in an upright position.

FIG. 5 depicts the trailer unit 23 as it appears when the trailer is in the beginning phase of a pivot or folding motion. The trailer is shown folding at pivot points 14. Hitch 15 is also bending at an angle, as its preferable design permits relief of stress on the trailer unit 23 and motor vehicle 22 as the trailer folds back on itself. FIG. 5 shows a swivel tongue unit 25, which is a preferable hitch 15, with hitch pin 27 that extends through and fastens swivel apparatus 26 to intermediary tongue 28, which intermediary tongue 28 in turn inserts at one end into vehicle hitch 29. The swivel apparatus 26 is rotatably connected to Front-frame 1 at its apex 24 by an axle means.

In FIG. 5, The trailer unit 23 can pivot because the fastening means 16 has been removed by the user of the trailer unit 23 to permit the pivoting action. Once the fastening means 16 is released, the main trailer body 21 will tilt back in the position as shown in the drawing 5. In most cases, this position will be accomplished without any effort, but in some instances, this initial position may be accomplished either by moving the trailer unit 23 in reverse, or by manually pushing down on the main trailer body 21. In this position, the diagonal support bars 8 are substantially parallel to the ground and the protruding ends of the lengthwise bars of upper frame 5 will catch the ground. These rearmost protruding ends form the "backstop" of the trailer as it pivots on itself at pivot points 14 as the driver of the motor vehicle 22 moves in reverse.

Figure 6:
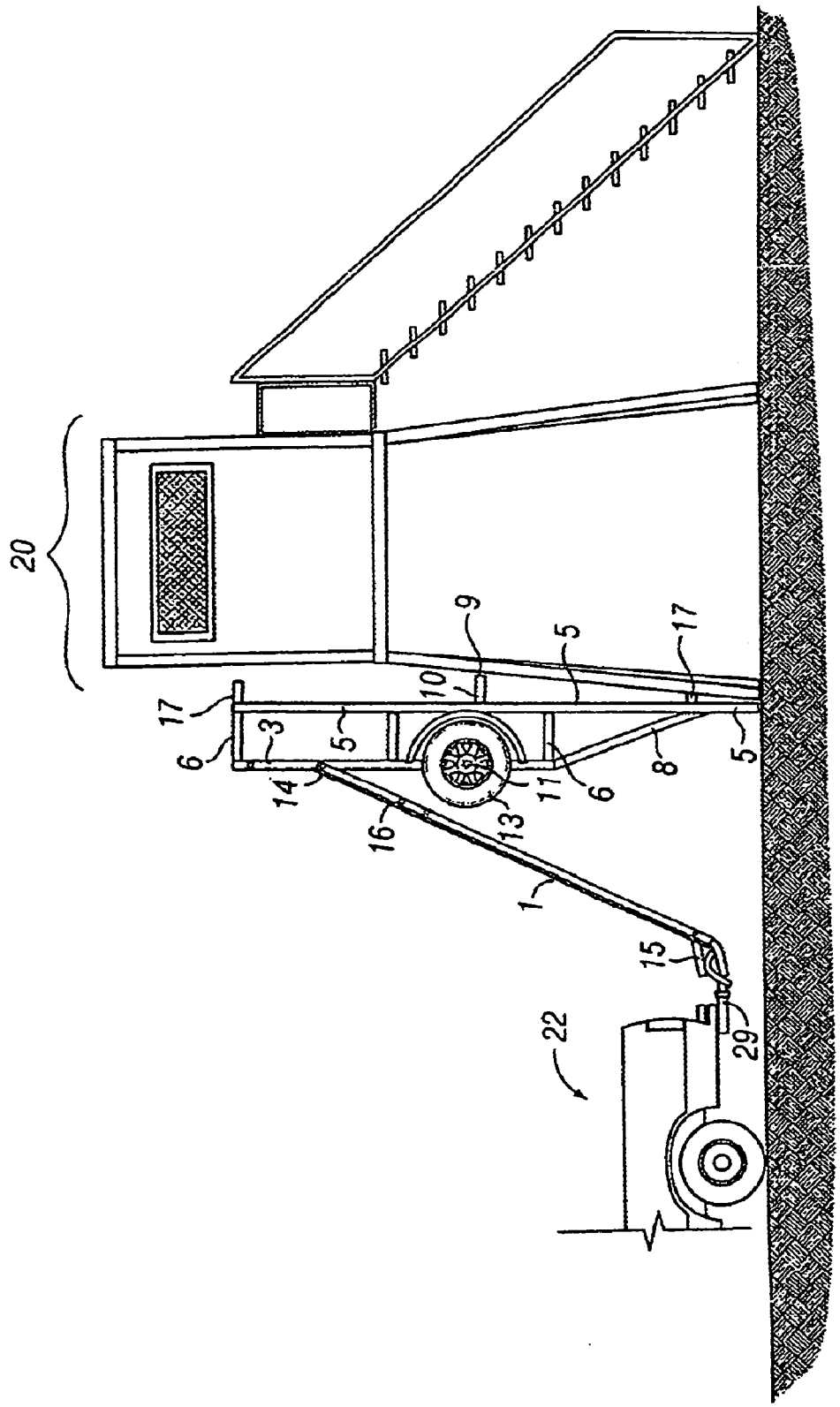
FIG. 6 is a straight side view of the trailer as it would appear in a fully pivoted position immediately prior to disengagement of the game blind from the assembly, and with the pivoted trailer and blind in an upright position.

FIG. 6 depicts the trailer unit 23 as it would appear in its most upright position during use, as it appears while standing or retrieving a game blind 20. As is the case, the game blind 20 is now in a position to be either fastened or released from the trailer unit 23 from the blind rest bars 17 and upper frame cross support bar 9.

Figure 7:
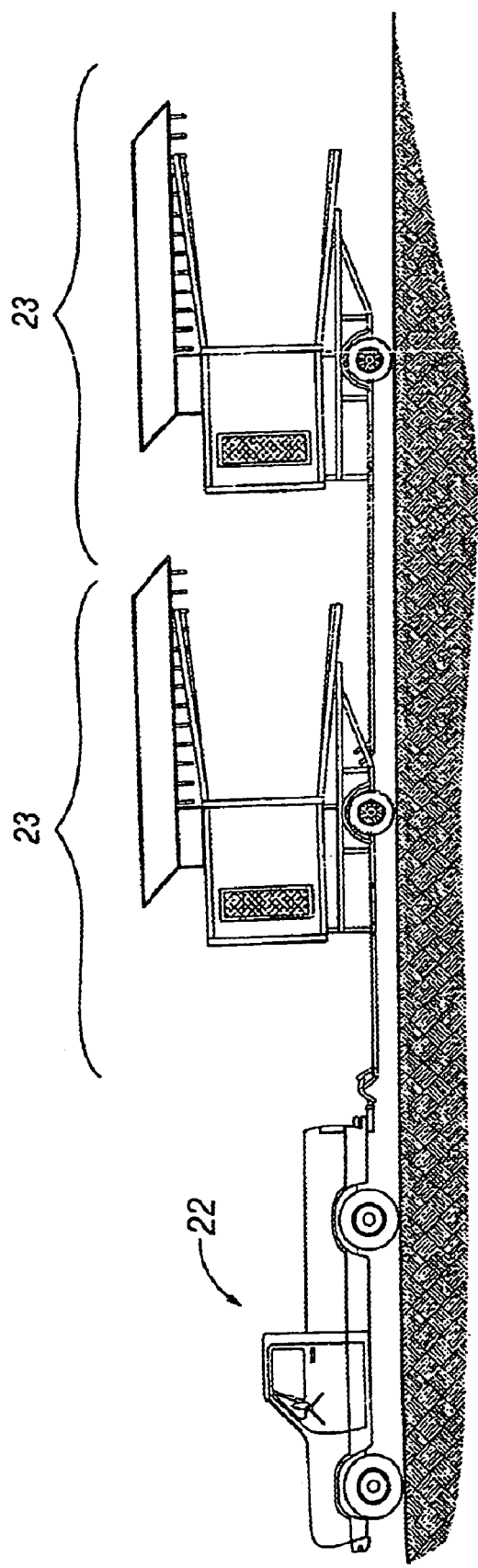
FIG. 7 is a side view of the trailer with a blind affixed for transport, with the trailer connected to a second trailer, so that the user transports multiple trailer and blind assemblies at the same time.

FIG. 7 depicts a further inventive aspect of the present invention, which is that the trailer units 23 are made to hitch to other trailer units 23, so that a user may transport multiple game blinds 20 simultaneously. Two trailers with two games blinds 20 are shown, but as many trailers can be hooked to one another as a motor vehicle 22 can pull safely. The functionality shown in FIG. 7 is accomplished by having a hitch unit affixed to the rearmost portion of main trailer body 21, preferably at either the frame end cross support bar 7 or at the rearmost widthwise bar of lower frame 3.

We claim:

1. A rapid assembly game blind transport trailer comprising:
   (a) a trailer unit formed of a Front-frame component and a main trailer body;
   (b) a plurality of pivot points connecting said Front-frame component and said main trailer body by rotatable hinging means, where said trailer unit folds on itself at said pivot points, and so that the Front-frame component and main trailer body fold against one another in upward direction, and
   (c) a detachable freestanding game blind secured by a fastening means to said main trailer body; wherein said detachable freestanding game blind and said main trailer body each contact the ground as said detachable freestanding game blind is moved to an upright position and separated from said main trailer body.

2. The rapid assembly game blind transport trailer of claim 1 further comprising a hitch means adapted to connect a motor vehicle to said trailer unit.

3. The rapid assembly game blind transport trailer of claim 2 wherein the hitch means is a swivel tongue unit.

4. The rapid assembly game blind transport trailer of claim 1 wherein to prevent the trailer from pivoting during transport, a fastening means is used to secure the front-frame component to the main trailer body.

5. The rapid assembly game blind transport trailer of claim 4, wherein said fastening means are located where said front-frame component meets said main trailer body, and at positions forward of said pivot points.

6. The rapid assembly game blind transport trailer of claim 1 further comprising at least one wheel assembly on each side of said trailer unit.

7. The rapid assembly game blind transport trailer of claim 1 wherein said Front-frame component is stabilized by at least one Front-frame cross support bar extending between and fixedly connecting a Front-frame component first bar and a second bar at equidistant points along their lengths.

8. The rapid assembly game blind transport trailer of claim 1 wherein said main trailer body is further comprised of an upper frame and a lower frame fixedly connected to one another by a plurality of connector joints.

9. The rapid assembly game blind transport trailer of claim 8 wherein said lower frame is supported by at least one lower frame cross support bar extending between and fixedly connecting lengthwise bars of said lower frame at points equidistant along their length.

10. The rapid assembly game blind transport trailer of claim 8 wherein said upper frame is supported by at least one upper frame cross bar.

11. The rapid assembly game blind transport trailer of claim 8 further comprising at least one blind rest bar.

12. The rapid assembly game blind transport trailer of claim 8 wherein first and second lengthwise bars of said upper frame form an angle of at least ninety degrees relative to a widthwise third bar of said upper frame so that said lengthwise bars gradually flare out and away from the trailer unit as they extend to the rearmost portion of the trailer unit.

13. The rapid assembly game blind transport trailer of claim 1 wherein a framework of said trailer unit is formed from a material from the group consisting essentially of steel, reinforced aluminum, iron, titanium or metal alloys.

14. The rapid assembly game blind transport trailer of claim 1 wherein Front-frame component is in the range of 40 to 300 inches in length, and with a width in the range of 0 to 200 inches, to provide adequate leverage for the function of the trailer.

15. The rapid assembly game blind transport trailer of claim 1 wherein the main trailer body is of a width in the range of 30 to 200 inches and a length in the range of 60 to 400 inches.

16. The rapid assembly game blind transport trailer unit of claim 1, wherein said front frame component comprises a first hole therethrough and said main trailer body comprises a second hole therethrough, said trailer having a pin member removably received in said first and second holes so as to fix said game blind in a horizontal orientation.

17. The rapid assembly game blind transport trailer unit of claim 1, wherein said front frame component comprises a yoke having a first side and a second side, said first hole formed therethrough.

18. The rapid assembly game blind transport trailer unit of claim 1, said first end of said front frame component having a swivel tongue unit thereon suitable for connecting with the trailer hitch.

19. The rapid assembly game blind transport trailer unit of claim 1, said game blind comprising:

a framework with legs extending therefrom;

a compartment affixed to said framework, said compartment positioned forwardly of said legs on said main trailer body.

20. The rapid assembly game blind transport trailer unit of claim 19, wherein at least a portion of said legs extend out beyond said main trailer body opposite said front frame component.

21. The rapid assembly game blind transport trailer unit of claim 1, further comprising two trailer units connected to one another for transport.

* * * * *